3,796,703
ACRYLAMIDE DERIVATIVES OF SUBSTITUTED PIPERAZINES

Claude P. Fauran, Michel J. Turin, and Guy M. Raynaud, Paris, and Janine M. Thomas, Neuilly, France, assignors to Delalande S.A., Courbevoie, Hauts-de-Seine, France
No Drawing. Filed Jan. 14, 1972, Ser. No. 217,936
Claims priority, application France, Jan. 21, 1971, 7101885
Int. Cl. C07d 51/72
U.S. Cl. 260—240 J                4 Claims

ABSTRACT OF THE DISCLOSURE

Compounds of the formula

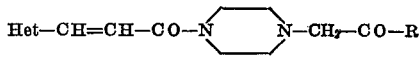

in which

Het is thienyl, furyl or pyridyl, and
R is ethoxy, pyrrolidino or isopropylamino,
are prepared by reacting Het—CH=CH—COCl with

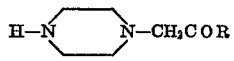

The compounds possess anticonvulsive, anxiolytic, analgesic, antiinflammatory, hypotensive and vasodilatory properties.

---

The present invention relates to novel acrylamide derivatives of substituted piperazines, their process of preparation and their therapeutic application.

The acrylamides in accordance with the invention correspond to the general formula:

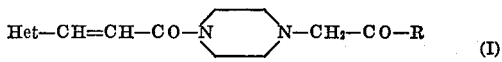 (I)

in which:

Het represents a heterocyclic radical selected from thienyl, furyl and pyridyl, and
R represents an ethoxy, pyrrolidino or isopropylamino radical.

The process according to the invention comprises reacting an acrylic acid chloride of the formula:

Het—CH=CH—COCl                (II)

in which Het has the same significance as in Formula I, with a monosubstituted piperazine of the formula:

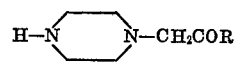

in which R has the same significance as in Formula I.

The following preparations are given by way of example to illustrate the invention.

EXAMPLE I 1-(2'-thienyl acryloyl)-4-(pyrrolidinocarbonylmethyl) piperazine maleate (Code No. 7054)

A solution of 40 g. of 2-thienyl acrylic acid chloride in ethyl acetate is prepared in a 1 liter reaction vessel, with agitation. 50 g. of sodium carbonate is added thereto, followed slowly by a solution of 50 g. of (pyrrolidinocarbonylmethyl) piperazine in 200 ml. of ethyl acetate. The temperature progressively increases to 50° C. Once such addition has been effected, the mixture is refluxed for 1 hour. After cooling, the organic solution obtained is washed with 300 ml. of water. The solution is then concentrated. The product obtained is taken up in acetone and treated with an equivalent of maleic acid. After drying, the maleate is recrystallized from 96° alcohol. Melting point=190° C. Yield=47%.

Empirical formula=$C_{21}H_{27}N_3O_6S$

Elementary analysis.—Calculated (percent): C, 56.11; H, 6.05; N, 9.35. Found (percent): C, 56.23; H, 6.12; N, 9.16.

EXAMPLE 2

1-(3'-pyridyl acryloyl)-4-(isopropylaminocarbonylmethyl)piperazine (Code No. 7041)

28 g. of (isopropylaminocarbonylmethyl) piperazine are dissolved in 400 ml. of ethyl acetate, and 32 g. of sodium carbonate are added thereto. 31 g. of finely-divided nicotinic acid chloride are added to such solution, with agitation. The temperature increases to about 30° C. The mixture is then refluxed for 1 hour.

The organic solution, after cooling, is washed with 300 cc. of water and then concentrated to about 250 ml. The product obtained crystallizes. Melting point=140° C. Yield=63%. Empirical formula=$C_{17}H_{24}N_4O_2$.

Elementary analysis.—Calculated (percent): C, 64.53; H, 7.65; N, 17.71. Found (percent): C, 64.57; H, 7.52; N, 17.52.

The compounds listed in Table I have been prepared by identical methods of operation.

TABLE I

Het—CH=CH—CO—N⟨⟩N—R

| Code No. | Het | R | Form | Empirical formula | Molecular weight | Melting point in °C. | Yield in percent | Elementary analysis Calculated C | H | N | Found C | H | N |
|---|---|---|---|---|---|---|---|---|---|---|---|---|---|
| 7055 | (thiophene) | —CH₂—CO—NH—CH(CH₃)₂ | HCl | C₁₆H₂₄ClN₃O₂S | 357.89 | 230 | 44 | 53.69 | 6.76 | 11.74 | 53.53 | 6.80 | 11.54 |
| 7058 | Same as above | —CH₂—COOC₂H₅ | Maleate | C₁₉H₂₄N₂O₇S | 424.46 | 150 | 66 | 53.76 | 5.70 | 6.60 | 53.66 | 5.71 | 6.52 |
| 7087 | (pyridine) | —CH₂—CO—N⟨⟩ | Base | C₁₈H₂₄N₄O₂ | 328.40 | 137 | 57 | 65.83 | 7.37 | 17.06 | 65.75 | 7.21 | 16.86 |
| 7089 | Same as above | —CH₂—COOC₂H₅ | ...do... | C₁₆H₂₁N₃O₃ | 303.35 | 88 | 66 | 63.35 | 6.98 | 13.85 | 63.15 | 6.78 | 13.85 |
| 7089 | (furan) | —CH₂—CO—N⟨⟩ | Maleate | C₂₁H₂₆N₄O₇ | 433.45 | 180 | 44 | 58.19 | 6.28 | 9.70 | 58.11 | 6.35 | 9.52 |
| 70111 | Same as above | —CH₂—CO—NH—CH(CH₃)₂ | Base | C₁₆H₂₃N₃O₃ | 305.37 | 142 | 54 | 62.93 | 7.59 | 13.76 | 63.05 | 7.76 | 13.73 |
| 7076 | ...do... | —CH₂—COOC₂H₅ | Maleate | C₁₉H₂₄N₂O₈ | 408.40 | 138 | 69 | 55.87 | 5.92 | 6.86 | 55.77 | 6.04 | 6.76 |

The compounds of Formula I have been studied on animals in the laboratory and have been shown to possess anticonvulsive, anxiolytic, analgesic, anti-inflammatory, hypotensive and vasodilatatory properties.

(1) Anticonvulsivant and anxiolytic properties: The compounds of Formula I possess the property of inhibiting, administered by oral means, the mortality provoked in the mouse by the administration of cardiazol.

By way of example, with a dose of 75 mg./kg./p.o., the Compound No. 7055 exercises a protective effect on animals of 50%.

(2) Analgesic properties: The compounds of Formula I administered by oral means on the mouse are capable of reducing the number of painful stretchings produced by the intraperitoneal injection of acetic acid.

The results obtained with a certain number of compounds are given in Table II, the dose administered being 100 mg./kg./p.o.

TABLE II

| Code No.: | Percentage protection |
|---|---|
| 7041 | 40 |
| 7055 | 50 |
| 7058 | 65 |
| 7076 | 50 |
| 7089 | 45 |
| 70111 | 40 |

(3) Anti-inflammatory properties: The compounds of Formula I, administered by oral means on the rat, are capable of reducing the under-planatary oedema produced by the local injection of carraghenine.

The results obtained with a certain number of the compounds are given in Table III.

TABLE III

| Code No. | Dose administered in mg./kg.p.o. | Percentage diminution of oedema, percent |
|---|---|---|
| 7041 | 100 | 36 |
| 7054 | 100 | 42 |
| 7055 | 50 | 47 |
| 7058 | 100 | 40 |

(4) Hypotensive properties: Administered by intraveinous means on the anaesthetised rat, the compounds of Formula I provoke a lowering of the arterial pressure.

By way of example, in a dose of 2 mg./kg./iv., the Compound No. 7089 lowers the arterial pressure of 45% over a period of 40 minutes.

(5) Vasodilatatory properties: The compounds of Formula I are capable of augmenting the flow of the coronary vessels of the isolated heart of a guinea-pig when said compounds are added in the perfusion liquid of said organ.

By way of example, in a dose of 2.5 μg./ml. of Compound No. 7076 in the perfusion liquid, the augmentation of flow is 45%.

One can see from the results shown above, and those shown in the following Table IV that the difference between the pharmacologically active dose and the lethal dose is sufficiently great to permit the compounds of Formula I to be used in therapeutics.

TABLE IV

| Code No. | Approximate DL 50 mg./kg./p.o. |
|---|---|
| 7041 | 1200 |
| 7054 | 1450 |
| 7055 | 850 |
| 7058 | 1450 |
| 7076 | 1500 |
| 7089 | 950 |
| 70111 | 900 |

The compounds of Formula I are useful in the treatment of convulsive states and crises, anxiety, inflammatory and other pains, hypertensions and diverse circulatory insufficiencies.

They may be administered by oral means in the form of tablets, dragees and gelules containing 25 to 200 mg. of active ingredient (3 times a day) and by parenteral means in the form of ampoules containing 10 to 100 mg. of active ingredient (2 times a day).

Accordingly, the present invention also relates to a therapeutic composition comprising a compound of the General Formula I together with a therapeutically acceptable carrier.

What we claim is:
1. A compound of the formula

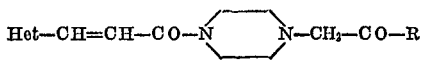

in which:

Het is 2-thienyl or 3-pyridyl, and
R is ethoxy, pyrrolidino or isopropylamino, and the pharmaceutically acceptable acid addition salts thereof.

2. A compound of the formula

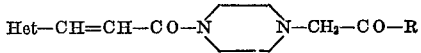

in which:

Het is 2-thienyl, 2-furyl or 3-pyridyl, and
R is pyrrolidino or isopropylamino, and the pharmaceutically acceptable acid addition salts thereof.

3. A compound according to claim 2, in which Het is 2-thienyl and R is pyrrolidino.

4. A compound according to claim 2, in which Het is 3-pyridyl and R is isopropylamino.

References Cited

UNITED STATES PATENTS 2,882,271    4/1959    Janssen _____ 260—240 J

OTHER REFERENCES

Hsien-Yu Cheng et al., Yao Hsueh Hsueh pao, vol. 10, pp. 407–416 (1963).

Fauran et al., Chim. Therapeutica, vol. 4, No. 4, pp. 290–292 (1969).

Venters et al., Chemical Abstracts, vol. 59, col. 1564 (1963).

JOHN D. RANDOLPH, Primary Examiner

U.S. Cl. X.R.

424—250; 260—268 H, 268 MK